(12) United States Patent
Sapija et al.

(10) Patent No.: US 12,287,043 B2
(45) Date of Patent: Apr. 29, 2025

(54) MOTORIZED VALVE BACKUP CIRCUIT

(71) Applicant: B/E Aerospace, Inc., Winston Salem, NC (US)

(72) Inventors: Dariusz Celestyn Sapija, Kiełczówek (PL); Filip Andrzej Sobolewski, Wieluń (PL); Iwona Herbik, Odolanow (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 135 days.

(21) Appl. No.: 18/174,529

(22) Filed: Feb. 24, 2023

(65) Prior Publication Data

US 2023/0279963 A1    Sep. 7, 2023

(30) Foreign Application Priority Data

Mar. 3, 2022  (EP) ...................................... 22461519
Jan. 30, 2023  (EP) ...................................... 23154073

(51) Int. Cl.
  *F16K 31/04*  (2006.01)
  *H02J 7/00*   (2006.01)
  *H02J 7/34*   (2006.01)

(52) U.S. Cl.
  CPC .......... *F16K 31/046* (2013.01); *H02J 7/0063* (2013.01); *H02J 7/345* (2013.01); *H02J 2207/50* (2020.01)

(58) Field of Classification Search
  CPC .. H02J 7/34; H02J 7/345; H02J 7/0063; H02J 50/001; H02J 9/061; H02J 2207/50; H02J 2207/10; F16K 31/046; F16K 31/04
  USPC ....................................................... 318/560
  See application file for complete search history.

(56) References Cited

U.S. PATENT DOCUMENTS

| 10,151,089 B2 | 12/2018 | Saruwatari | |
|---|---|---|---|
| 10,186,898 B2 | 1/2019 | Stupka | |
| 2006/0138985 A1* | 6/2006 | Sato ........................ | H02P 27/00 318/434 |
| 2010/0007301 A1* | 1/2010 | Ochsenbein ............ | H02J 9/062 318/563 |

(Continued)

FOREIGN PATENT DOCUMENTS

JP    2019060212    4/2019

OTHER PUBLICATIONS

European Patent Office, European Search Report dated Aug. 8, 2022 in Application No. 22461519.5.

*Primary Examiner* — Gabriel Agared
(74) *Attorney, Agent, or Firm* — SNELL & WILMER L.L.P.

(57) ABSTRACT

A control system for a motorized valve. The control system comprises a backup circuit comprising energy storage means and a discharge gate through which the energy storage means can be selectively discharged to provide a discharge actuation pulse to the valve to cause the valve to move to a safe (e.g. closed) position. The backup circuit further includes an energy harvesting circuit for harvesting power from the power supply lines. The energy harvesting circuit is able to harvest sufficient energy within the duration for a single actuation pulse provided by the motor controller to charge the energy storage means from zero to a sufficient level to allow the backup circuit to generate at least one corresponding discharge actuation pulse for causing the valve to move to the safe position.

15 Claims, 4 Drawing Sheets

(56) References Cited

U.S. PATENT DOCUMENTS

2011/0267068 A1* 11/2011 Xu ........................... H02J 7/35
                  324/427
2017/0370492 A1  12/2017 Obrist et al.
2019/0049036 A1   2/2019 Naritya
2021/0310581 A1  10/2021 Sapija et al.

* cited by examiner

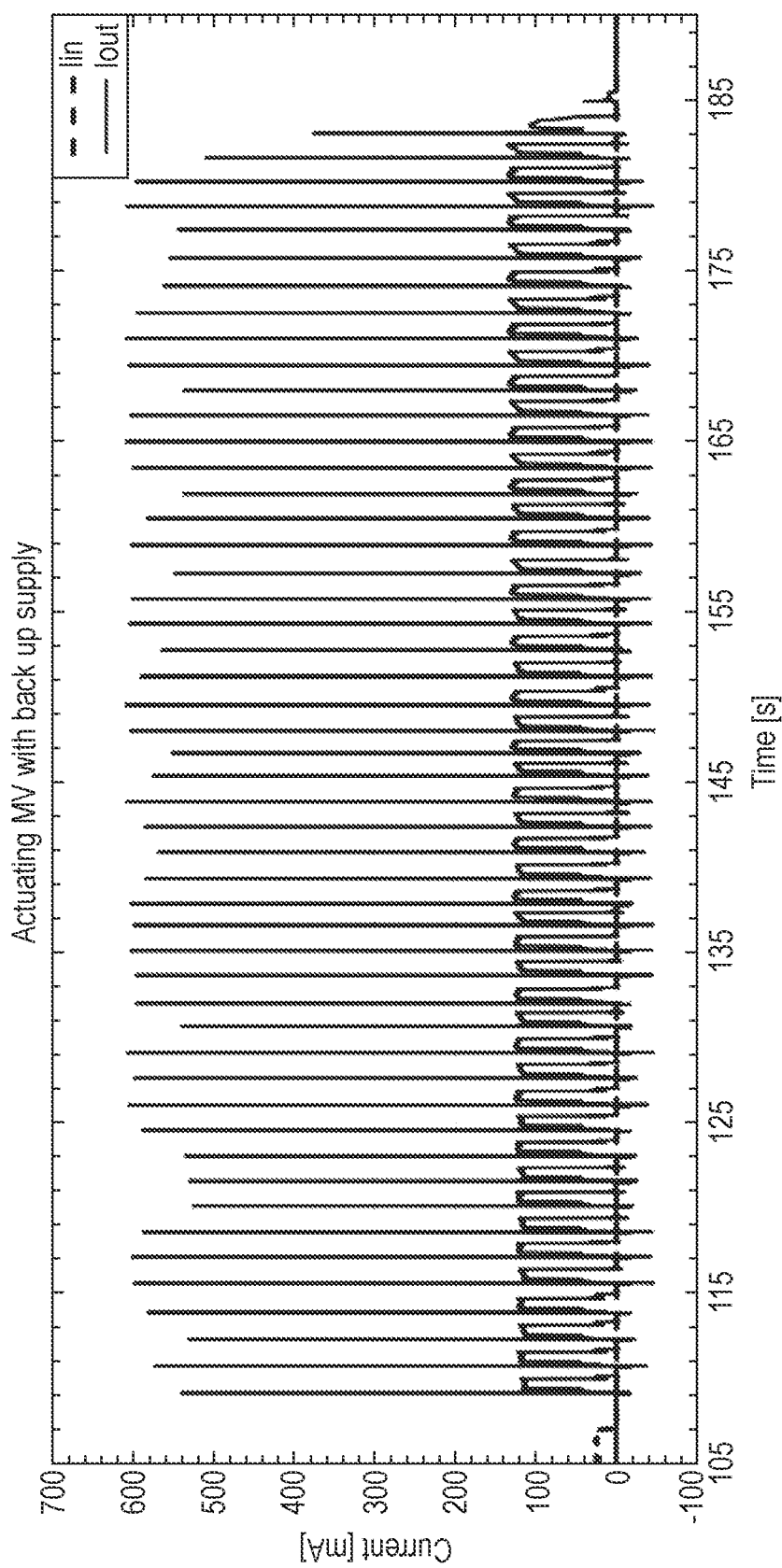

MOTORIZED VALVE BACKUP CIRCUIT

CROSS-REFERENCE TO RELATED APPLICATIONS

This application claims priority to, and the benefit of, EP Patent Application No. 22461519.5, filed Mar. 3, 2022 entitled "MOTORIZED VALVE BACKUP CIRCUIT," (hereinafter the '519 Application) and claims priority to EP Patent Application No. 23154073.3 filed Jan. 30, 2023 entitled "MOTORIZED VALVE BACKUP CIRCUIT" (hereinafter the '073 Application). The '519 Application and the '073 Application are hereby incorporated by reference in their entirety for all purposes.

FIELD

The technology described herein relates to the operation and control of motorized valves, and in particular to backup systems for motorized valves.

BACKGROUND

Motorized valves are electrically controlled valves. These are often used for controlling fluid flow, and are increasingly used for aerospace applications, especially with the current drive towards more electric aircraft (MEA). An example of this is for toilet or waste-water systems on-board aircraft, where the valve is used to control the flow of water to the system. A problem that may exist with such motorized valve is that the electrical control system may fail. In that case, if the valve were left in an open position, for example, there may be an uncontrolled water flow. This can result in incomplete drainage, and eventually an overflow of the toilet or waste tank, which can in turn lead to damage to the system or the environment that the system is installed in.

Therefore, it may be desired to provide an emergency backup system that is operable to return the valve to a desired safe state (e.g. a closed position) in the event of a failure of the control system. Existing emergency backup systems may however be relatively bulky which may render them less suitable for aircraft applications.

Accordingly, the Applicants believe there remains scope for improved control systems for motorized valves.

SUMMARY

A first aspect of the technology described herein comprises a control system for a motorized valve, the control system comprising:
 a first power supply line; and
 a motor controller that is configured to provide first actuation pulses along the first power supply line to cause the valve to move to a first position, the first actuation pulses being provided along the first power supply line at a first voltage level, wherein the first actuation pulses provided by the motor controller are each associated with a (minimum) duration corresponding to a time required for causing the valve to move to the first position,
  the control system further comprising a backup circuit comprising energy storage means and a discharge gate through which the energy storage means can be selectively discharged to provide a corresponding discharge actuation pulse to the valve to cause the valve to move to a second position, wherein the energy storage means provides voltage output at a lower level than the first voltage level, the backup circuit including a step up circuit positioned between the energy storage means and the discharge gate, the step up circuit configured to step the energy storage means voltage output up to a desired second voltage level for providing a corresponding discharge actuation pulse for causing the valve to move the valve to the second position,
 the backup circuit further including an energy harvesting circuit configured to harvest power from the first power supply line to charge the energy storage means.

In an embodiment of the first aspect, the backup circuit is arranged and configured such that the energy harvesting circuit is operable to harvest sufficient energy within the minimum duration for a single actuation pulse provided by the motor controller along the first power supply line to charge the energy storage means from zero to a sufficient level to allow the backup circuit to generate at least one corresponding discharge actuation pulse at the desired second voltage level for causing the valve to move to the second position.

The above arrangement provides an improved control system for a motorized valve. In particular, the motorized valve is provided with a backup circuit that is capable of automatically moving the valve to a second (safe, e.g. closed) position, e.g. in the event of a power failure. The backup circuit is therefore in embodiments operable as an emergency backup circuit to provide higher functional safety, as will be explained further below. Furthermore, as will also be explained further below, this backup functionality can be achieved using a relatively smaller, lighter weight circuit, that is therefore particularly suited for use on-board aircraft.

According to the above arrangement, the backup circuit is operable to harvest energy from the power supply lines between the motor controller and the valve each time the motor controller provides an actuation pulse to the valve for causing the valve to change position.

As used herein, an actuation pulse is a transient power signal that is provided to the valve to cause the valve (i.e. an element of the valve) to move position. The actuation pulse is therefore a power pulse that provides power to the valve to cause the change in valve position. An actuation pulse may have a relatively short duration, e.g. corresponding to the time taken to move the valve between positions. Depending on the valve configuration, a typical actuation pulse may have a duration of between about 0.5 and 1.5 seconds, this being the minimum duration required for causing the valve to move position.

In this way, the backup circuit is powered (charged) by the motor controller during normal motor controller operation. In particular, the backup circuit is designed such that the energy harvesting circuit is capable of harvesting sufficient energy from a single first actuation pulse, i.e. during a single instance of the motor controller actuating the valve to a first (e.g. open) position, to allow the backup circuit to be able to produce one or more corresponding second actuation pulse to return the valve to a second (safe, e.g. closed) position.

For instance, the actuation pulses provided by the motor controller are each associated with a (minimum) duration corresponding to a time required for causing the valve to move to the first position. For example, for a bidirectional valve (having first/second positions), the minimum duration would correspond to the shortest time required for moving the valve from the second position to the first position. For valves having more than two positions, the minimum duration may be the shortest time taken to move the valve into the first position from one of the other available positions. According to the above arrangement, what matters is that within the minimum duration of an actuation pulse (e.g. within a timeframe of between about 0.5 and 1.5 seconds, depending on the valve configuration), the backup circuit can always be sufficiently charged from zero to generate corresponding pulses to move the valve back to a second (safe, e.g. closed) position.

That is, the backup circuit is designed, and its components suitably arranged and selected, to facilitate such rapid charging of the energy storage means from a single actuation pulse ('single-shot' charging), such that the backup circuit is effectively self-sufficient, and can always move the valve to the second (safe, e.g. closed) position following an (each) activation of the valve to the first (e.g. open) position by the motor controller. Thus, in embodiments, the backup circuit is powered only by harvesting energy from the power supply lines during normal use, without therefore requiring any additional external backup power supply.

In this respect, it will be appreciated that the energy storage means may not be at zero for most of the time, such that most of the time it will not need to be charged from zero. However, the above arrangements provide a failsafe mechanism where the emergency backup is designed such that the energy storage means can be charged from zero to the desired level within the minimum actuation pulse duration. That this effect is achieved can readily be verified by suitably testing the motor controller, e.g. by first discharging the energy storage means to zero, and then providing an actuation pulse, and harvesting energy therefrom, in order to re-charge the energy storage means, accordingly.

The above arrangement may thus provide various benefits compared to other possible approaches.

For example, in normal operation, the motor controller is operable to provide first actuation pulses along the first power supply line to cause the valve to move to a first, e.g. open, position. That is, when it is desired to move the valve to the first (e.g. open) position, a corresponding first actuation pulse can be provided by the motor controller, and passed along the first power supply line to the valve.

In embodiments, the motor controller further comprises a second power supply line, along which the motor controller can provide corresponding actuation pulses to cause the valve to move to a second, e.g. closed, position. In that case, in normal operation, the motor controller may provide respective power pulses along the first and second power supply lines in order to move the valve between the first (e.g. open) and second (safe, e.g. closed) positions, as desired.

In general, the valve may also be moveable to third or further positions, in which case corresponding third or further power supply lines and signals may be provided. In such cases, the second position need not necessarily be a 'closed' position but may be any other 'safe' position where the flows are suitably controlled, e.g. to avoid risk of damage to the system within which the valve is operated. Thus, whilst various embodiments will be described in relation to a bidirectional valve which can be moved between open/closed positions, it will be appreciated that the valve may have multiple positions, and the first and second positions may be any suitable positions from the available positions.

In other words, in embodiments, the normal valve operation is controlled by the motor controller (only), e.g. in the normal manner for controlling a valve.

However, there may be instances of power failure, or other faults within the control system, that mean that the motor controller is not able to provide suitable such pulses to move the valve. Thus, in the event of a power failure, wherein the motor controller is not able to move the valve to the second (safe, e.g. closed) position, the valve may become stuck in the first (e.g. open) position, for example. This can then cause damage to the system within which the valve is installed. Thus, in such situations, it may be desired to be able to return the valve to the second (safe, e.g. closed) position.

According to the above arrangements, in the event of a power failure, the backup circuit can thus be triggered to discharge the energy storage means through the discharge gate in order to generate an appropriate pulse to cause the valve to move to the second (safe, e.g. closed) position. The backup circuit in embodiments can thus be triggered in such circumstances to produce a discharge pulse that is analogous to the actuation pulses that would normally be provided by the motor controller (e.g. the actuation pulses provided along the second power supply line, where that is provided, to cause the valve to move to the second (safe, e.g. closed) position).

This discharge operation is in embodiments triggered by the control system detecting a power failure. Thus, in embodiments, the control system further comprises a monitoring circuit that is operable to monitor for power failure and/or other such faults that mean that the motor controller is not able to control the position of the valve. In response to the monitoring circuit detecting such power failure, the backup circuit can then be (and is) triggered to discharge the energy storage means to produce a second actuation pulse to cause the valve to move to the second (safe, e.g. closed) position.

In this way, by triggering the backup circuit appropriately, the control system is always able to move the valve to the second (safe, e.g. closed) position, even in the event of a failure of the motor controller.

It will be appreciated that in some cases, even when power failure is detected, it may not be desirable to move (e.g. close) the valve immediately. For example, it may be desired to wait a certain period in order to allow the operation that was being performed with the valve in the first (e.g. open) position to complete, before triggering the backup circuit to move the valve to the second (safe, e.g. closed) position. Thus, in embodiments, the control system implements a timeout function, such that in response to the monitoring circuit detecting a power failure, the control system is configured to wait for a predetermined period before triggering the backup circuit discharge to cause the valve to move to the second (safe, e.g. closed) position. There may thus be a pre-set delay before triggering the discharge of the energy storage means. This delay may be set appropriately, e.g. depending on the valve operation in question.

Whilst embodiments are described above in relation to an emergency backup circuit, that is triggered in response to detecting a power failure, other arrangements would also be possible for triggering the backup circuit to discharge the energy storage means to cause the valve to move to the second (safe, e.g. closed) position.

For example, in many systems, it is often the case that after moving the valve to the first (e.g. open) position, it is known that the valve should subsequently be moved back to the second (safe, e.g. closed) position. Thus, in some cases, the backup circuit may be triggered to cause the valve to move to the second (safe, e.g. closed) position after a predetermined time period has elapsed, e.g. in response to the absence of a positive signal from the motor controller to move the valve to the second (safe, e.g. closed) position.

That is, if no second signal has been received from the motor controller within an expected time period, the control system may determine on that basis that an error has occurred, and automatically trigger the backup circuit to move the valve to the second (safe, e.g. closed) position.

Correspondingly, it is also contemplated that in some arrangements the backup circuit could always be used to return the valve to the second (safe, e.g. closed) position, even in normal operation. That is, in some embodiments, the motor controller may be configured only to move the valve to the first (e.g. open) position, with the backup circuit always being used to then move the valve (back) to the second (safe, e.g. closed) position. This can provide an overall simpler arrangement, e.g. with a single power supply line control to move the valve to a first (e.g. open) and automatic return of the valve to a second (e.g. closed) position. Various other arrangements would be possible in that regard.

As mentioned above, the backup circuit comprises energy storage means. These may take any suitable and desired form. The energy storage means is rechargeable. In embodiments, the energy storage means comprises one or more capacitors, and in embodiments, a bank of plural capacitors. Where there are plural capacitors these may be arranged in any suitable and desired fashion. In embodiments, the capacitors are arranged in parallel. In embodiments, these capacitors are supercapacitors.

The use of supercapacitors may be particularly advantageous in the context of the technology described herein due to their high capacity to size ratio, and tolerance for repeated discharge. In embodiments, the supercapacitors are relatively lower voltage supercapacitors (e.g. voltage rated 1-5 VDC, such as 3.3 VDC). This helps facilitate reducing the size and bulk of the energy storage means, as will be explained further below.

The backup circuit further comprises a discharge gate through which the energy storage means can be discharged. The discharge gate is thus operatively connected to the valve to provide actuation pulses to the valve to cause the valve to move position.

The backup circuit may generally be configured to provide similar actuation pulses as those that would otherwise (normally) be provided by the motor controller to cause the valve to move position. The discharge gate may thus be connected to a power supply line to the valve in order to inject pulses onto one or more of the power supply lines to cause the valve to move position.

In particular, in an embodiment, the discharge gate may be connected to the (e.g.) second power supply line (where this is provided) in order to inject discharge pulses that are analogous to the corresponding actuation pulses that would be provided by the motor controller to move the valve to the second (safe, e.g. closed) position in normal operation.

Other arrangements would however be possible. For instance, it may be possible for all of the pulses to be provided to the valve along the same power supply line (e.g. with the polarity or timing of the pulses controlling whether the valve is caused to move to the first or second position) in which case the discharge pulses provided by the backup circuit may be injected onto the first power supply line. It would also be possible to provide a separate connection between the backup circuit and the valve although this may generally be less desirable as this may require further modification of the valve itself (rather than using the existing power supply lines).

The actuation pulses provided by the motor controller may be provided at a first voltage level, e.g. determined by the system within which the valve is installed. For example, in aircraft applications, the first voltage level may be 28 VDC, since this is the standard voltage bus level within an aircraft. However, depending on the application, other suitable voltage levels may be used, as desired.

Correspondingly, the second actuation pulses that are provided to the valve by the backup circuit should also be provided at a similar voltage level to the actuation pulses provided by the motor controller, or at least a sufficiently high voltage level, in order to be able to control the valve position in a similar fashion. In some embodiments, the second actuation pulses provided by the backup circuit are provided at the first voltage level (e.g. 28 VDC). However, it has been found that it is possible to move the valve using voltages that are lower than the first voltage level. Thus, in embodiments, the second actuation pulses provided by the backup circuit are provided at a lower voltage level than the pulses provided by the motor controller. That is, the second voltage level may be less than or equal to the first voltage level. For example, the second actuation pulses provided by the backup circuit are in embodiments provided at an output level of between 18 and 28 VDC.

It will be appreciated that the energy storage means of the backup circuit could be selected to provide the desired output level (e.g. 18-28 VDC). However, this would typically require relatively large and bulky energy storage means. Furthermore, such large energy storage means could not then be easily and rapidly charged to the desired level. This would therefore not provide the desired single-shot charging that is achieved by the technology described herein.

In contrast, according to the above arrangements, the energy storage means has a lower voltage rating than the first voltage level (the voltage level at which the actuation pulses are provided by the motor controller). This then means that the energy storage means can be more rapidly charged and thus facilitates charging the energy storage means using energy harvested from the power supply lines in use.

In particular, the backup circuit components are arranged and sized to allow the energy storage means to be sufficiently charged from a single actuation pulse provided by the motor controller. The energy storage means in the technology described herein is thus charged by harvesting energy from the power supply lines, e.g. during normal operation. The energy harvesting circuit may thus be connected to at least the first power supply line so as to harvest energy therefrom for charging the energy storage means.

In embodiments, the energy harvesting circuit is also connected to the second, and any further, power supply lines and is operable to harvest energy from pulses provided along any of the power supply lines.

As explained above, the backup circuit is operable such that a single actuation pulse provided by the motor controller is able to charge the energy storage means from zero to a sufficient level to allow the backup circuit to produce a corresponding one or more pulses to move the valve to a second (safe, e.g. closed) position. This can be achieved by suitably under sizing the energy storage means, e.g. by using lower voltage rated energy storage means, to facilitate a more rapid charging from the power supply lines during normal operation. For example, in embodiments, the energy storage means may be sufficiently charged within the time period associated with a single actuation pulse provided by the motor controller. For example, the energy storage means may be sufficiently charged within a time period of between about 0.5 and 1.5 seconds.

For instance, as mentioned above, in embodiments, the energy storage means comprises one or more capacitors. The lower voltage rating thus means that the capacitors can be relatively smaller in size compared to higher voltage rated capacitors. To give an example, the capacitors may be rated for 3.3 VDC operation. This is much lower than the typical voltage level that the actuation signals are provided. For example, when used in aircraft applications, the desired voltage level for the actuation pulses is 28 VDC, which is roughly 8 times higher than the capacitor output.

Thus, it is a benefit of the technology described that the energy storage means can therefore be undersized, and lower voltage-rated, and hence more rapidly charged, e.g. in a 'single-shot' manner, as described above. In particular, this single-shot charging means that the backup circuit is effectively always capable of moving the valve back to the second (safe, e.g. closed) position, since it can be sufficiently charged from the first actuation pulse. This then avoids the need, e.g., to directly charge the backup circuit from an external power supply, thus further reducing the size and bulk of the overall control system. The relatively smaller size of the energy storage means further allows the backup circuit to be attached or embedded within an existing PCB or valve housing, thus facilitating manufacture and installation.

The energy harvesting circuit may therefore comprise a step down circuit for stepping down the voltage between the power supply lines and the energy storage means to a desired (lower) level for charging the energy storage means. This step down circuit may be implemented in any suitable and desired manner.

Correspondingly, in order to produce discharge pulses at the desired second voltage level (to be able to move the valve to the second position) the backup circuit further comprises a step up circuit for stepping up the voltage output of the energy storage means to the desired voltage level. The step up circuit may take any suitable and desired form. This then allows the second actuation pulses that are produced by discharging the energy storage means to be stepped up to a desired level for actuating the valve, e.g., and in embodiments, to a similar (e.g. 18-28 VDC) voltage level as the actuation pulses provided by the motor controller. The step up circuit should thus be configured for stepping up the voltages appropriately.

The overall operation of the backup circuit may be controlled in any suitable manner. For instance, in embodiments, a microcontroller is provided that is operable to control the charging and discharging of the energy storage means in the manner described above. Any suitable and desired microcontroller may be used for this purpose. Correspondingly, the overall control of the backup circuit may generally be performed in other manners, including either in hardware or embedded software, as desired. Various arrangements would be possible in this regard.

The control system can be incorporated within a motorized valve system comprising the control system and a motorized valve. The motorized valve system may be used for any suitable purpose. As mentioned above, the technology described herein may be particularly suited for applications on-board an aircraft. This may include, for example, for controlling toilet and/or waste water systems on-board the aircraft. Various other examples would of course be possible.

The technology described herein also extends to a method of controlling a valve using a control system as described above. A second aspect of the technology described herein therefore comprises a method of operating a motorized valve using the control system according to any embodiments of the first aspect described above.

The method may thus comprise, during normal operation, controlling the valve using the motor controller by providing first actuation pulses to move the valve to the first position; whereas in response to a failure of the motor controller, the method comprises producing a second actuation pulse by discharging the backup circuit through the discharge gate to move the valve to the second position.

The control system that is used in this second aspect may thus have any or all of the optional features described above, at least to the extent they are not mutually exclusive.

Various examples will now be described by way of example only and with reference to the drawings.

BRIEF DESCRIPTION OF THE DRAWINGS

FIG. 1 shows an overview of a motorized valve assembly that the technology described herein may be applied to;

FIG. 3 and FIG. 4 present the results of proof of concept testing for a control system according to the embodiment of FIG. 2.

DETAILED DESCRIPTION

The technology described herein relates to control systems for motorized valves. Motorized valves may find application in various situations. For example, they may be used on-board aircraft for toilet and waste water systems.

Figure 1:
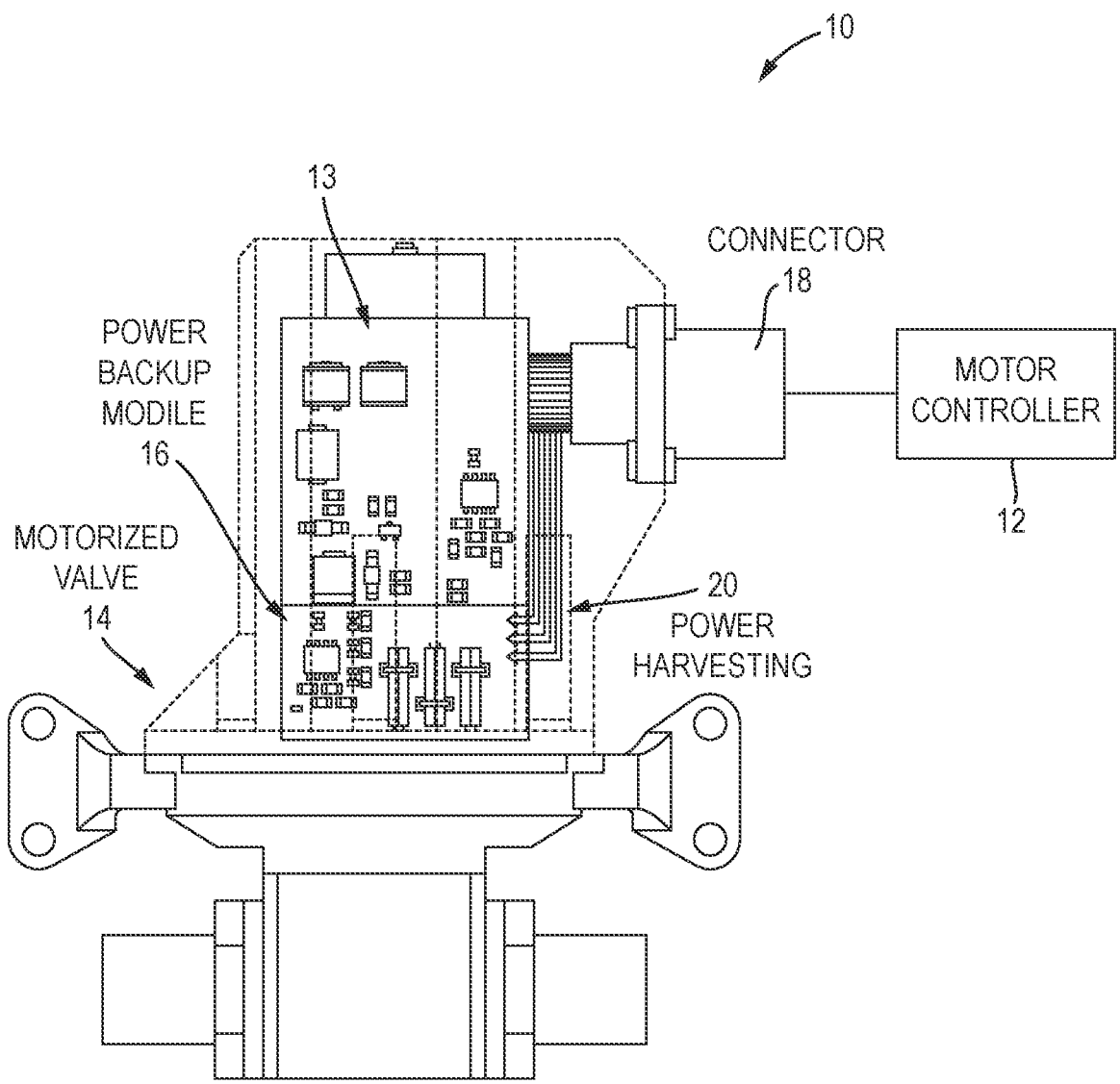

As shown in FIG. 1, a motorized valve assembly 10 may include a motorized valve 14 and a connector 18. The connector 18 may connect the motorized valve assembly 10 to (e.g.) a motor controller 12 that is arranged to provide power drawn from an aircraft electrical distribution network to the motorized valve 14. As depicted in FIG. 1, the motorized valve 14 may include further electronics 13 embedded in the motorized valve 14 for control (e.g. positioning control) over the motor in the valve, but this will not be described in further detail. Various different types of valve arrangements are known and the motorized valve assembly 10 may generally have any suitable and desired configuration.

The control system of the technology described herein may generally be applied to any suitable valve arrangement, as desired. Thus, whilst an example will be described below in the context of a bidirectional valve, having first (open) and second (closed) positions, it will be appreciated that the technology described herein may be applied to other (e.g. multidirectional) valve arrangements.

Figure 2:
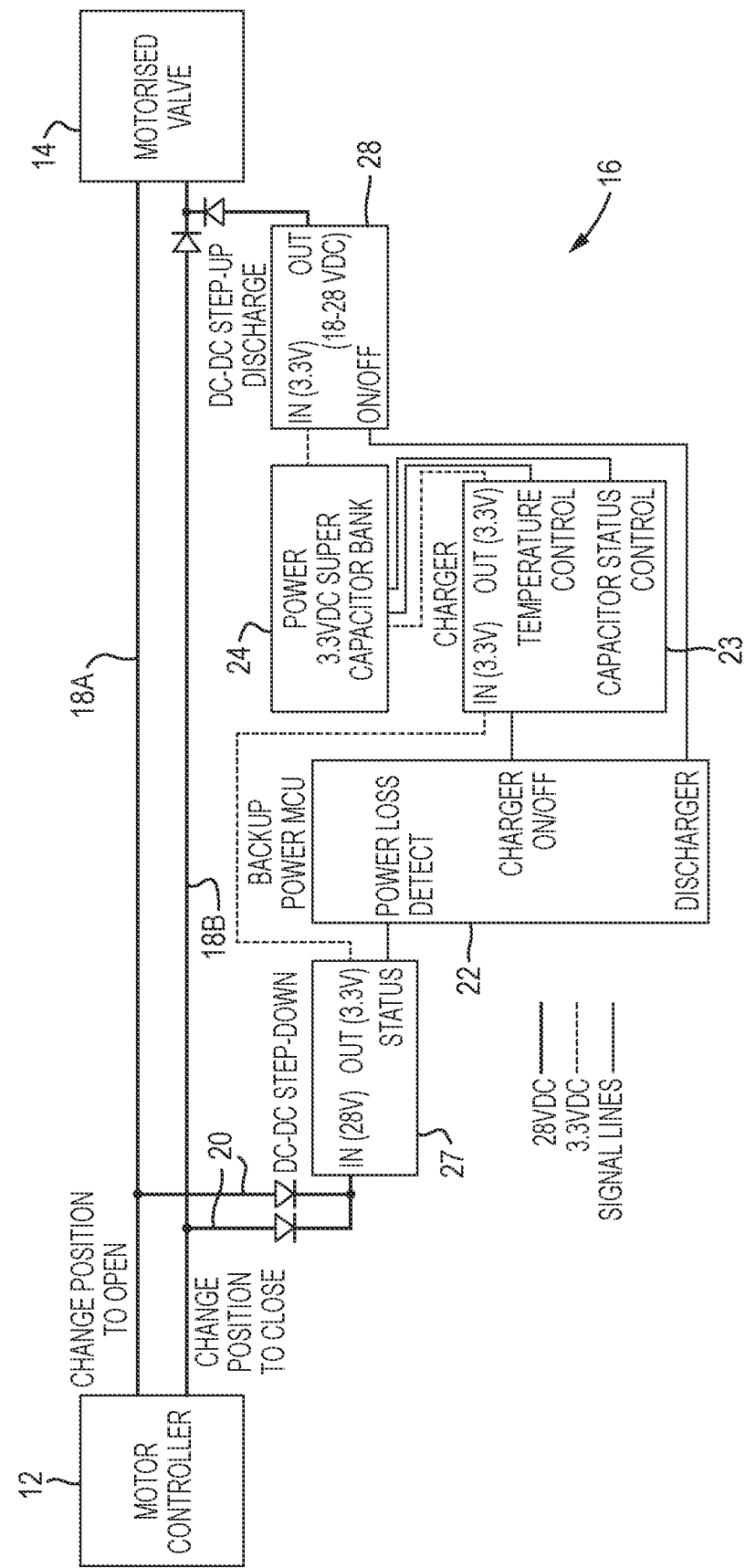
FIG. 2 shows a block diagram of a control system for a motorized valve according to an embodiment.

FIG. 2 shows a control system for a motorized valve according to an embodiment that comprises a backup circuit in the form of power backup module 16. As shown in FIG. 1, the power backup module 16 is designed to fit inside the motorized valve assembly 10 case. The backup module 16 may be mechanically and/or electronically attached to the electronics 13, or may be a part of the same circuit board as the electronics 13. Indeed, a benefit of the control system according to embodiments is that it can be made relatively smaller and lighter weight to facilitate such installation.

As shown in FIG. 2, the control system includes first and second power supply lines 18A, 18B that provide respective signals to the valve to cause the valve to move to the open or closed positions. The power supply lines 18A, 18B are independent. Thus, in normal operation, the motor controller 12 sends signals along the respective power supply lines 18A, 18B in order to control the opening/closing of the valve 14. For instance, in order to open the valve, a first actuation signal (pulse) is sent along the first power supply line 18A. Correspondingly, when it is desired to close the valve, a corresponding actuation signal (pulse) is sent along the second power supply line 18B.

In the example shown, these power control signals are provided at 28 VDC, which is typical for electrical systems within aircraft. Other arrangements would however be possible.

The control system further comprises the power backup module 16. The power backup module 16 is arranged to control the valve position in the event of a power failure, or other such failure, that means that the motor controller 12 is unable to control the valve properly. As shown in FIG. 2, the power backup module 16 comprises a microcontroller unit (MCU) 22 for controlling the overall backup operation, a charging controller 23 for controlling charging of a supercapacitor bank 24, and a discharge gate 28. In FIG. 2, the first power supply line 18A is directly connected to the valve 14 (which may include further embedded electronics for 'local' motor control, not shown in FIG. 2). However, the discharge gate 28 is connected to the second power supply line 18B, such that the power backup module 16 is operable to inject pulses onto the second power supply line 18B to cause the valve to close, e.g. in response to the MCU 22 detecting a power loss in the system that means that the valve may otherwise be stuck in the open system.

Thus, in normal operation, the MCU 22 keeps the discharge gate 28 closed, so that signals pass directly from the motor controller 12 along the respective power supply lines 18A, 18B. On the other hand, when the MCU 22 detects power loss in the control system, the MCU 22 can then initiate a discharge control, wherein the MCU 22 opens the discharge gate 28 and triggers a discharge of the supercapacitor bank 24 through the discharge gate 28 to inject a pulse onto the second power supply line 18B to cause the valve to close. In the present example, rather than immediately closing the valve, the MCU 22 is configured to wait for a predetermined period before activating the discharge gate to close the valve. Thus, the MCU 22 may implement a timer (timeout) function to prevent the valve from immediately closing, even in the event of a power loss detection. In that case the valve is open for a specific time to let the water flow through to flush clean the toilet. If, after the timer has expired, no additional signal has been provided along the second power supply line 18B, the MCU 22 then opens the discharge gate 28 and triggers the discharge of the supercapacitor bank 24 through the discharge gate 28 to close the valve and achieve safe position.

In order to reduce the size of the power backup module 16, the supercapacitors in the supercapacitor bank 24 are low voltage rated. For example, in the present example, the supercapacitors are rated at 3.3 VDC, much lower than the voltage level used by the motorized valve system 10 (i.e. 28 VDC). The discharge gate 28 is thus provided with a DC-DC step-up discharge circuit that is configured to step up the 3.3 VDC output of the supercapacitor bank 24 to a suitable level (e.g. in the range 18-28 VDC) for closing the valve. For instance, in an example, the 3.3 VDC output from the supercapacitor bank 24 is stepped up to 18 VDC, which has been found sufficient to close the valve.

The use of lower rated capacitors in turn also facilitates a more rapid charging of the supercapacitor bank 24. In particular, as shown in FIG. 2, the power backup module 16 is charged during normal operation of the valve by harvesting energy from both of the power supply lines 18A, 18B through power harvesting lines 20. Thus, whenever the motor controller provides a signal to the valve along either of these power supply lines 18A, 18B some of the energy is harvested through power harvesting lines 20 and used by the MCU 22 to trigger the charging control circuit 23 to charge the supercapacitor bank 24. As shown in FIG. 2, the charging control circuit 23 provides the charging power signals to the supercapacitor bank 24. The charging control circuit 23 may also monitor the temperature and/or charging status, etc., in order to control the charging operation. A step down circuit is thus provided in the form of DC-DC step down charger 27 that is operable to step down the 28 VDC signals from the power supply lines 18A, 18B to a suitably low level (e.g. 3.3 VDC in this example) for safely charging the supercapacitor bank 24.

The effect of all of this is to provide a system that can therefore be rapidly charged during normal operation, such that for every instance of providing an actuation pulse to open the valve, the backup circuit is ensured to have sufficient energy stored in order that the backup circuit can then be used to subsequently close the valve, if necessary. In particular, as shown in FIG. 3, which will be discussed further below, the power backup module 16 is designed such that a single actuation pulse provided along the first power supply line 18A is able to charge the supercapacitor bank 24 sufficiently such that the power backup module 16 can then generate multiple signals for closing the valve.

Figure 3:
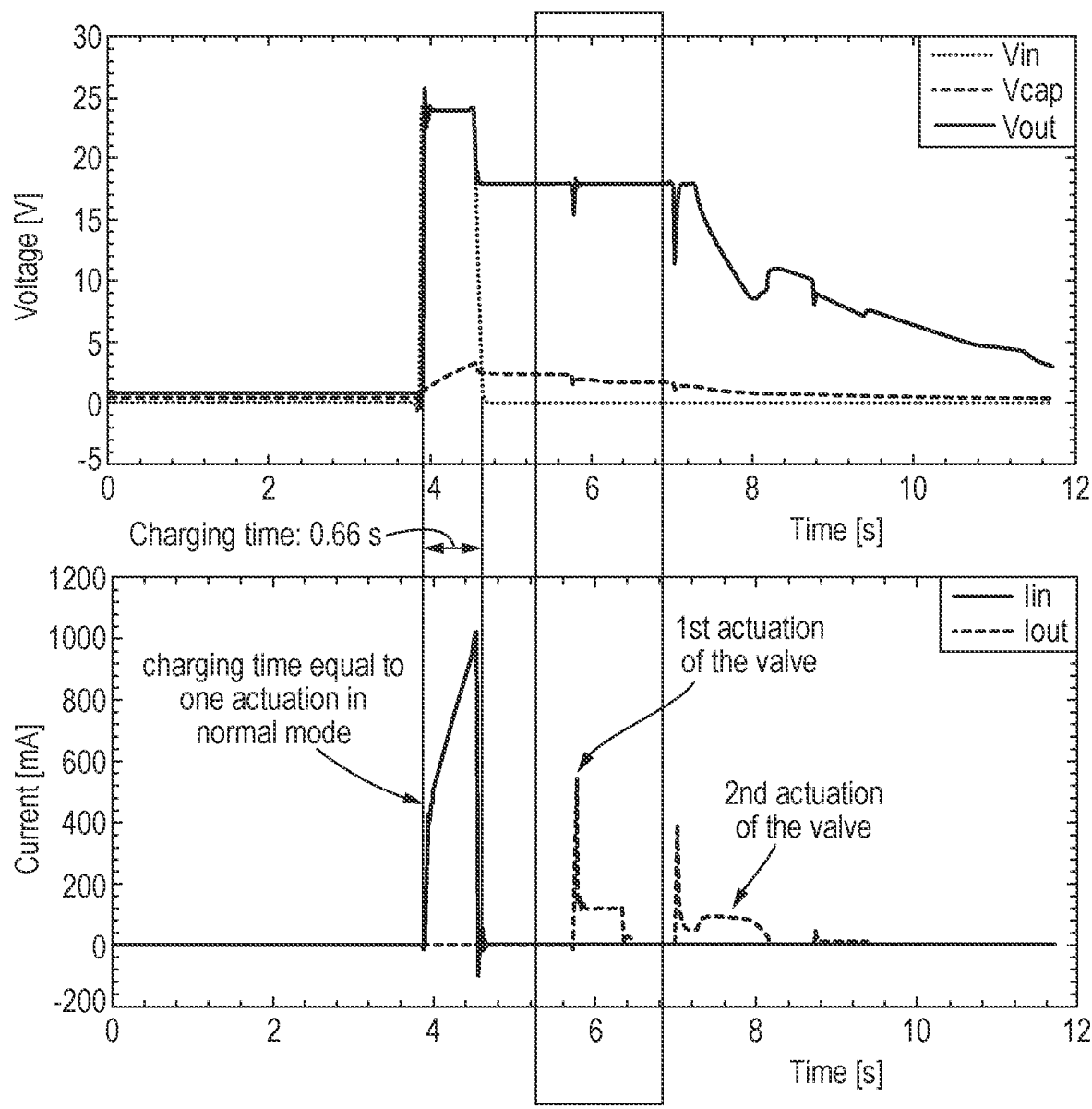

FIGS. 3 and 4 show the results of proof of concept testing for the above arrangement. In particular, for this testing, a system was designed in which the motor controller operates at 28 VDC, and wherein the energy storage means comprises a bank of supercapacitors that provide a voltage output of 3.3 VDC. In the tested arrangement, the energy storage means comprised a bank of four supercapacitors, arranged in parallel. However, any other suitable number and arrangement of supercapacitors may be used, as desired. The step up circuit was arranged to step this voltage output up to 18 VDC.

As shown in FIG. 3, it was possible to charge the supercapacitor bank fully during a period of 0.66 seconds, corresponding to the duration for a single actuation pulse provided by the motor controller. Furthermore, following this charging, the backup circuit could be discharged multiple times in order to move the valve. For example, the current needed for the single rotation in the steady run is −600 mA and the proof of concept testing shows that it is possible to provide sufficient current using the backup circuit with charging times between 0.5 and 1.5 seconds, corresponding to typical durations of actuation pulses. That is, a single pulse provided by the motor controller to open the valve is able to charge the supercapacitor bank sufficiently to allow the backup circuit to close the valve at least twice. FIG. 4 shows that this cycle of charging the supercapacitor bank whilst opening the valve with the motor controller and then closing the valve by discharging the supercapacitor bank can be repeated over many cycles of operation.

Thus, FIGS. 3 and 4 confirm that a control system according to the technology described herein can work well to provide a higher safety motorized valve control with a relatively simpler, lower weight design. However, it will be appreciated that these merely show the results for one example of a control system according to the technology described herein, and those skilled in the art will recognize that the specific values mentioned above may be varied, as desired, e.g. depending on the valve application in question, whilst still providing the benefits of the technology described herein. That is, those skilled in the art will appreciate how to select appropriate components based (e.g.) on the desired voltage level and desired charging time for designing a backup circuit that is able to operate in the manner described herein.

Thus, the foregoing detailed description has been presented for the purposes of illustration and description. It is not intended to be exhaustive or to limit the technology described herein to the precise form disclosed. Many modifications and variations are possible in the light of the above teaching.

The described embodiments were chosen in order to best explain the principles of the technology described herein and its practical applications, to thereby enable others skilled in the art to best utilize the technology described herein, in various embodiments and with various modifications as are suited to the particular use contemplated. The scope is defined by the claims appended hereto.

What is claimed is:

1. A control system for a motorized valve, the control system comprising:
   a first power supply line;
   a second power supply line; and
   a motor controller that is configured to provide first actuation pulses along the first power supply line to cause the valve to move to a first position, the first actuation pulses being provided along the first power supply line at a first voltage level, wherein the first actuation pulses provided by the motor controller are each associated with a minimum duration corresponding to a time required for causing the valve to move to the first position,
   the control system further comprising a backup circuit comprising energy storage means and a discharge gate through which the energy storage means can be selectively discharged to provide a corresponding discharge actuation pulse to the valve to cause the valve to move to a second position,
   wherein the energy storage means provides voltage output at a lower level than the first voltage level, the backup circuit including a step up circuit positioned between the energy storage means and the discharge gate, the step up circuit configured to step the energy storage means voltage output up to a desired second voltage level for providing a corresponding discharge actuation pulse for causing the valve to move to the second position,
   the backup circuit further including an energy harvesting circuit configured to harvest power from the first power supply line to charge the energy storage means,
   wherein the backup circuit is arranged and configured such that the energy harvesting circuit is operable to harvest sufficient energy within the minimum duration for a single actuation pulse provided by the motor controller along the first power supply line to charge the energy storage means from zero to a sufficient level to allow the backup circuit to generate at least one corresponding discharge actuation pulse at the desired second voltage level for causing the valve to move to the second position,
   wherein the motor controller is configured in normal operation to provide second actuation pulses along the second power supply line to cause the valve to move to the second position, and wherein the discharge gate is connected to the second power supply line such that, in the event of a motor controller failure wherein the motor controller is unable to provide an actuation pulse to cause the valve to move to the second position, the backup circuit can inject a corresponding discharge actuation pulse onto the second power supply line to cause the valve to move to the second position.

2. The control system of claim 1, wherein the energy harvesting circuit is configured to also harvest energy from the second power supply line in normal operation.

3. The control system of claim 1, further comprising a monitoring circuit for monitoring for power loss in the control system, wherein in response to determining that there is a motor controller failure preventing the motor controller moving the valve to the second position, the control system is configured to discharge the backup circuit to inject a corresponding discharge actuation pulse to cause the valve to move to the second position.

4. The control system of claim 3, wherein in response to determining that there is a motor controller failure preventing the motor controller moving the valve to the second position, the control system is configured to wait for a predetermined period before triggering the discharge of the backup circuit.

5. The control system of claim 1, wherein the first position is an open position permitting fluid flow through the valve, and wherein the second position is a closed position in which fluid flow is not permitted through the valve.

6. The control system of claim 1, wherein the energy storage means comprises one or more supercapacitors.

7. The control system of claim 1, wherein the first voltage level is 28 VDC.

8. The control system of claim 7, wherein the second voltage level is less than or equal to the first voltage level, optionally wherein the second voltage level is in the range 18 to 28 VDC.

9. The control system of claim 1, wherein the voltage output of the energy storage means is less than 50% of the first voltage level, optionally less than 25% of the first voltage level, optionally less than 15% of the first voltage level.

10. The control system of claim 1, wherein the energy storage means can be charged to sufficient level to produce one or more second actuation pulse in a period of less than 1.5 seconds, optionally in a period of less than 1 second.

11. The control system of claim 1, wherein the energy storage means can be charged to sufficient level to produce one or more second actuation pulse in a period of less than 1 second.

12. A motorized valve system comprising a motorized valve and a control system, wherein the control system comprises:
   a first power supply line; and
   a second power supply line; and
   a motor controller that is configured to provide first actuation pulses along the first power supply line to cause the valve to move to a first position, the first actuation pulses being provided along the first power supply line at a first voltage level, wherein the first actuation pulses provided by the motor controller are each associated with a minimum duration corresponding to a time required for causing the valve to move to the first position,
   the control system further comprising a backup circuit comprising energy storage means and a discharge gate through which the energy storage means can be selectively discharged to provide a corresponding discharge actuation pulse to the valve to cause the valve to move to a second position, wherein the energy storage means provides voltage output at a lower level than the first voltage level, the backup circuit including a step up circuit positioned between the energy storage means and the discharge gate, the step up circuit configured to step the energy storage means voltage output up to a desired second voltage level for providing a corresponding discharge actuation pulse for causing the valve to move to the second position, the backup circuit further including an energy harvesting circuit configured to harvest power from the first power supply line to charge the energy storage means, wherein the backup circuit is arranged and configured such that the energy harvesting circuit is operable to harvest sufficient energy within the minimum duration for a single actuation pulse provided by the motor controller along the first power supply line to charge the energy storage means from zero to a sufficient level to allow the backup circuit to generate at least one corresponding discharge actuation pulse at the desired second voltage level for causing the valve to move to the second position, wherein the motor controller is configured in normal operation to provide second actuation pulses along the second power supply line to cause the valve to move to the second position, and wherein the discharge gate is connected to the second power supply line such that, in the event of a motor controller failure wherein the motor controller is unable to provide an actuation pulse to cause the valve to move to the second position, the backup circuit can inject a corresponding discharge actuation pulse onto the second power supply line to cause the valve to move to the second position.

13. A water flow system comprising the motorized valve system as claimed in claim 12.

14. An aircraft toilet comprising the water flow system of claim 13.

15. A method of operating a motorized valve using the control system as claimed in claim 1, the method comprising:

providing the first actuation pulses along the first power supply line to cause the valve to move to the first position, the first actuation pulses being provided along the first power supply line at the first voltage level, wherein the first actuation pulse has the minimum duration corresponding to the time required for causing the valve to move to the first position, harvesting energy from the first actuation pulse to maintain the energy storage means charged to a sufficient level to allow the backup circuit to generate at least one corresponding discharge actuation pulse at the desired second voltage level for causing the valve to move to the second position.

\* \* \* \* \*